(12) United States Patent
Markovitz et al.

(10) Patent No.: US 10,767,080 B2
(45) Date of Patent: Sep. 8, 2020

(54) 1K WATERBORNE DRY-ERASE COATING COMPOSITION

(71) Applicant: THE SHERWIN-WILLIAMS COMPANY, Cleveland, OH (US)

(72) Inventors: Frank F. Markovitz, Lakewood, OH (US); Brian Makowski, Berea, OH (US); Jay A. Reimann, Mentor, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 6 days.

(21) Appl. No.: 16/186,923

(22) Filed: Nov. 12, 2018

(65) Prior Publication Data

US 2019/0077990 A1    Mar. 14, 2019

Related U.S. Application Data

(63) Continuation-in-part of application No. 15/604,732, filed on May 25, 2017, now Pat. No. 10,125,281.

(60) Provisional application No. 62/342,225, filed on May 27, 2016.

(51) Int. Cl.
| | | |
|---|---|---|
| *C09D 183/14* | (2006.01) | |
| *C08G 77/54* | (2006.01) | |
| *C08K 3/22* | (2006.01) | |
| *C09D 7/65* | (2018.01) | |
| *C09D 5/00* | (2006.01) | |
| *C09D 175/04* | (2006.01) | |
| *C08G 77/388* | (2006.01) | |
| *C08G 77/00* | (2006.01) | |
| *C08G 77/14* | (2006.01) | |
| *C09D 183/06* | (2006.01) | |
| *C09D 183/08* | (2006.01) | |
| *C09D 183/16* | (2006.01) | |

(52) U.S. Cl.
CPC ......... *C09D 183/14* (2013.01); *C08G 77/388* (2013.01); *C08G 77/54* (2013.01); *C08K 3/22* (2013.01); *C09D 5/008* (2013.01); *C09D 7/65* (2018.01); *C09D 175/04* (2013.01); *C08G 77/14* (2013.01); *C08G 77/70* (2013.01); *C08K 2003/2241* (2013.01); *C09D 183/06* (2013.01); *C09D 183/08* (2013.01); *C09D 183/16* (2013.01)

(58) Field of Classification Search
CPC .. C09D 183/14; C09D 183/08; C09D 183/06; C09D 183/16

USPC .................................................. 106/287.11
See application file for complete search history.

(56) References Cited

U.S. PATENT DOCUMENTS

| | | | |
|---|---|---|---|
| 3,961,977 A | 6/1976 | Koda et al. | |
| 5,587,502 A | 12/1996 | Moren et al. | |
| 6,726,304 B2 * | 4/2004 | Fassler ................. | B41J 2/16552 347/28 |
| 7,820,779 B2 | 10/2010 | Birukov et al. | |
| 7,989,651 B2 * | 8/2011 | Su ......................... | C07F 7/1804 556/436 |
| 8,153,156 B2 * | 4/2012 | Ravi ....................... | A61L 27/50 424/489 |
| 2002/0012022 A1 * | 1/2002 | Fassler ................. | B41J 2/16552 347/28 |
| 2007/0269488 A1 * | 11/2007 | Ravi ..................... | A61K 9/5192 424/429 |
| 2008/0221238 A1 * | 9/2008 | Su ......................... | C07F 7/1804 523/435 |
| 2012/0029143 A1 | 2/2012 | Sepeur et al. | |
| 2017/0240780 A1 | 8/2017 | Kramer et al. | |

FOREIGN PATENT DOCUMENTS

| | | |
|---|---|---|
| WO | 2013110046 | 7/2013 |
| WO | 2013141958 | 9/2013 |

OTHER PUBLICATIONS

International Search Report for application No. PCT/US2017/034366, dated Aug. 10, 2017 (3 pages).

Written Opinion for application No. PCT/US2017/034366, dated Aug. 10, 2017 (5 pages).

* cited by examiner

*Primary Examiner* — Margaret G Moore

(57) ABSTRACT

Disclosed is a coating composition suitable for coating onto a wall or other substrate to yield a dry-erase coating, The composition may be prepared by reacting an excess amount of an aminosilane with a carbonate, an epoxy alcohol, or both in aqueous media to yield a silylurethane, and/or a silylamino polyol. In some approaches, the compositions and/or methods may further include an epoxysilane, and allowing the epoxysilane to react with the aminosilane to yield an aminodisilane. This reaction will result in a coating composition that comprises one of a silylurethane, a silylamino polyol, or both, and the aminodisilane. The aqueous mixture of the silylurethane, the silylamino polyol, or both, and the aminodisilane together constitute a coating composition that, upon curing, forms a dry-erase coating.

20 Claims, No Drawings

1K WATERBORNE DRY-ERASE COATING COMPOSITION

CROSS-REFERENCE TO RELATED APPLICATIONS

This application is a Continuation-In-Part of U.S. application Ser. No. 15/604,732 filed May 25, 2017, now U.S. 10,125,281, and which claims benefit of U.S. Provisional Application No. 62/342,225 filed May 27, 2016, the entirety of both are hereby incorporated by reference.

TECHNICAL FIELD

The disclosure relates generally to a dry-erase coating composition suitable for many applications including coating interior wall surfaces. Upon coating an interior wall surface with the coating composition, the composition will cure to form a dry-erase coating on the interior wall surface.

BACKGROUND

Dry-erase boards, also referred to as whiteboards, have been manufactured commercially for many years. Dry-erase surfaces provide a writing surface with a non-porous character that prevents the penetration of dry-erase marker ink through the surface. Conventional dry-erase marker ink formulation includes a hydrophobic, oily release agent that inhibits permanent marking or staining of the whiteboard. The non-porous nature of the whiteboard combined with the oily, quick drying maker ink in dry erase markers allows the marker ink to be easily removed from the whiteboard.

To manufacture a whiteboard, the manufacturer coats a dry-erase coating composition onto a substrate, and allows the substrate to dry. A number of dry-erase coating compositions are known. Traditional dry-erase coating compositions are created using two components, which must be mixed together immediately prior to coating the composition onto the substrate. Such coatings are referred to as "2K" coating compositions. Many dry-erase coating compositions are formulated using organic solvents, which impart a high level of volatile organic compounds ("VOCs"), such as ethylene glycol, formaldehyde, or benzene, many of which are hazardous. In addition, the cure time for these coating compositions can be several days. In light of these attributes, such 2K dry-erase coating compositions are intended only for professional commercial application. In addition, some known dry-erase coating compositions included isocyanate compounds or epoxies. Isocyanates are hazardous, and epoxies are prone to yellowing over time.

It would be desirable to provide a dry-erase coating composition that is suitable for consumer application. For example, a homeowner, school, or office manager might wish to coat an interior wall surface with such a coating composition to thereby create a dry-erase "wall," or portion of a wall surface. Ideally, such a dry-erase coating composition would have a low VOC concentration (less than 150 grams/liter), and would be a. single-component (or "1K") composition that did not require pre-mixing by the consumer. The coating composition ideally would be suitable for interior architectural surfaces such as wood, drywall, cement, metal, and plaster, or over a primer coating. The dry-erase coating composition should cure at ambient temperature and without ancillary equipment such as ultraviolet lights. Upon curing, the coating composition should form a smooth, hard dry-erase coating that is resistant to interior moisture and humidity, and that is compatible with conventional dry-erase markers.

SUMMARY

In various nonexclusive embodiments, the present application provides a coating composition, a method for preparing a coating composition, a method for applying a coating composition, a cured coating composition, and a method for marking a surface.

In one approach, it has now been discovered that a dry-erase coating composition may be prepared by reacting an excess amount of an aminosilane with a carbonate and/or with an epoxy alcohol in aqueous media to yield a silylurethane crosslinker and/or a silylamino polyol crosslinker and/or both crosslinkers, introducing or including an epoxysilane, and allowing the epoxysilane to react with portions of the aminosilane to yield an aminodisilane crosslinker. This reaction will result in a coating composition that comprises the silylurethane and/or the silylamino polyol and the aminodisilane. The aqueous mixture of the silylurethane and/or the silylamino polyol and the aminodisilane together constitute a coating composition that, upon curing, forms a dry-erase coating. The coating composition can be formulated such that the dry-erase coating that is formed is smooth, hard, moisture-resistant, and durable, and compatible with conventional dry-erase ink formulations.

In some embodiments, the aminosilane can have a structure represented by the following Formula (1):

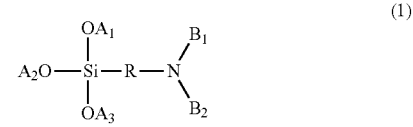

wherein $A_1$, $A_2$, and $A_3$ are the same or different and are hydrogen or a $C_1$ to $C_4$ alkyl group, $B_1$ and $B_2$ are the same or different and are hydrogen or a $C_1$ to $C_4$ alkyl group, with the proviso that at least one of $B_1$ and $B_2$ is hydrogen, and wherein R is a $C_1$ to $C_4$ alkylene group.

In some embodiments, the carbonate, if used, can have a formula according to the following Formula (2):

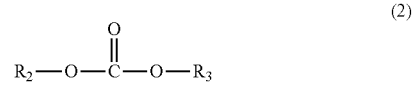

wherein $R_2$ and $R_3$ each independently are an alkyl group, or $R_2$ and $R_3$ form a cyclic structure that may include any one or more of an alkyl group, a hydroxyalkyl group, and a hydroxyl group as substituents.

In other embodiments, the epoxy alcohol, if used, can have a structure represented by the following Formula (2a):

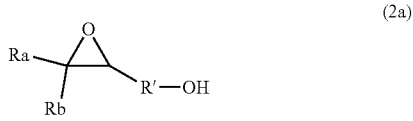

wherein R' is direct bond or a $C_1$ to $C_4$ alkylene linker and Ra and Rb are each independently a hydrogen or a $C_1$ to $C_4$ alkyl group. In other approaches, the epoxy alcohol is glycidol. The epoxy alcohol can be used instead of the carbonate or combined with the carbonate.

In some embodiments, the epoxysilane can have a structure according to the following Formula (3):

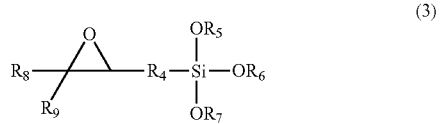
(3)

wherein $R_4$ includes any one or more of an alkylene group, a branched alkylene group, an ester group, or an ether group (optionally with hydroxyl substitution), $R_5$ to $R_7$ are the same or different and include alkyl groups, and $R_8$ and $R_9$ are the same or different and are hydrogen or a $C_1$ to $C_4$ alkyl group.

In one aspect, a coating composition prepared in accordance with the above method is provided. In another aspect, not mutually exclusive, the coating composition comprises water and a mixture of silylurethane and/or silylamino polyol crosslinkers and aminodisilane crosslinkers including those similar to the following Formulas (6), (7), and/or (8):

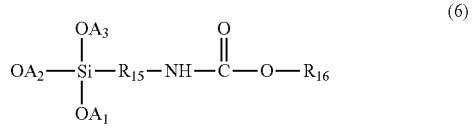
(6)

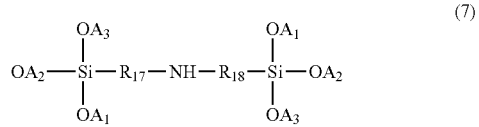
(7)

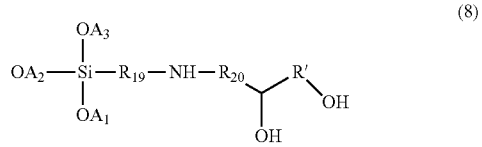
(8)

where $A_1$, $A_2$, and $A_3$ are the same or different as described above and are hydrogen or a $C_1$ to $C_4$ alkyl group, $R_{15}$ is an alkylene group or an alkylene amine group, and $R_{16}$ is an alkyl group including at least one hydroxyl group, $R_{17}$ is an alkylene group or an alkylene amine group, $R_{18}$ is an alkylene group optionally including at least one hydroxyl group, $R_{19}$ is an alkylene group or an alkylene amino group, $R_{20}$ is an alkylene group, and R' is as defined above.

As described in more detail below, the coating compositions will cure to form a coating composition, the cured coating composition being within another aspect of the present application. Also provided herein are methods of applying a coating composition to a surface and to methods of marking a surface including the coating compositions herein. These methods employ the novel coating composition and cured coating provided herein respectively. Also included herein are the use of the methods and coating compositions herein to make a dry-erase surface.

In any of the embodiments or approaches above, the methods and coating compositions may also include any of the following optional features in any combination thereof: wherein the each of $A_1$, $A_2$, and $A_3$ is hydrogen; and/or wherein the aminosilane is aminopropyl trisilanol; and/or wherein each of $A_1$, $A_2$, and $A_3$ is independently a $C_1$ to $C_4$ alkyl group; and/or wherein the aminosilane is an aminopropyl trialkoxysilane; and/or wherein the aminosilane is aminopropyl trimethylsilane; and/or wherein the epoxysilane is glycidoxypropyl trimethoxysilane; and/or wherein the method includes maintaining a reaction pH between 6 and 11; and wherein the method or composition further includes a plasticizer; and/or wherein the plasticizer is polyethylene glycol; and/or wherein the methods or composition further include a pigment; and/or wherein the pigment is titanium dioxide.

DETAILED DESCRIPTION

When prepared in accordance with the present teachings, it is possible to provide a dry-erase coating composition that has several desirable attributes. The coating composition can be an aqueous 1K coating composition that can have a low VOC content (less than 150 grams/liter; in some embodiments less than 125 grams/liter; in some embodiments less than 100 grams/liter; in some embodiments less than 75 grams/liter; in some embodiments less than 50 grams/liter; in some embodiments less than 25 grams/liter) and in some instances essentially zero VOC content (less than 5 grams/liter). Cure time can be on the order of 24 hours or less. Upon curing, the cured coating can exhibit excellent marker appearance and marker removal property, with minimal ghosting. The coating will be resistant to acetone and isopropanol, which are common whiteboard cleaning solvents, and also will be resistant to water. The composition can be formulated to have at least a 12-month shelf life. Notably, these attributes are not limiting and it is possible to formulate a coating composition in accordance with the present teachings that lacks some or all of the above attributes.

The coating compositions described herein are based on alkoxysilane technology. When used at high levels, alkoxysilanes can create a low surface energy film that reduces the chances of foreign bodies adhering to the surface. Alkoxysilanes also advantageously promote adhesion to multiple types of surfaces, and incorporate substantial crosslinking to resist penetration of marker ink. The crosslinked cured composition results in a non-porous surface on which the coating is applied.

Generally, in preparing the coating composition, an excess amount of an aminosilane with a carbonate and/or an epoxy alcohol in aqueous media are reacted to yield a silylurethane and/or a silylamino polyol, respectively. The carbonate or the epoxy alcohol can be used in combination or independently. Any suitable aminosilane may be employed, and, for example, the aminosilane may have a structure represented by the following Formula (1):

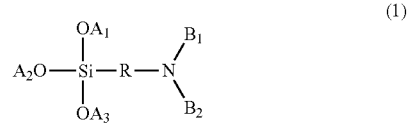
(1)

wherein $A_1$, $A_2$, and $A_3$ are the same or different and may be hydrogen or a $C_1$ to $C_4$ alkyl group, $B_1$ and $B_2$ are the same or different and may be hydrogen or a $C_1$ to $C_4$ alkyl group.

In some approaches, at least one of $B_1$ and $B_2$ is hydrogen, and where R is a $C_1$ to $C_4$ alkylene linker. In some embodiments, $A_1$, $A_2$, and $A_3$ each are hydrogen. For example, the aminosilane may comprise aminopropyltrisilanol. In other embodiments, $A_1$, $A_2$, and $A_3$ each may be a $C_1$ to $C_4$ alkyl group. In this instance, the aminosilane may be an aminopropyl trialkoxysilane, such as aminopropyl trimethoxysilane:

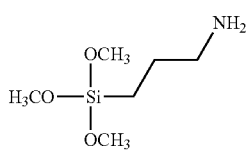

One such compound is sold as Dynasylan AMMO by Evonik Industries, Inc.

It is believed that generally the compound of formula (1) where any of $A_1$, $A_2$, and $A_3$ comprise an alkyl group will at least partially hydrate upon introduction to water to evolve a lower alcohol. For example, when $A_1$, $A_2$, and $A_3$ each comprise methyl, the following reaction will typically occur:

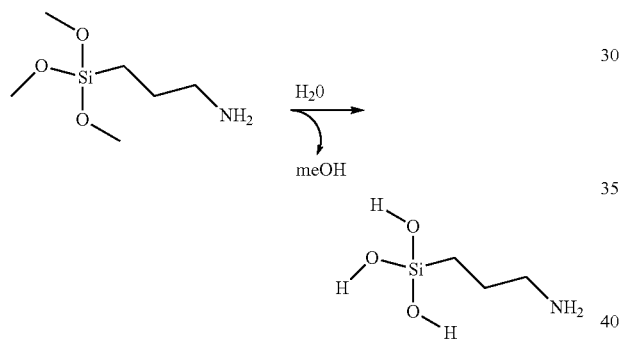

For example, when the aminosilane is aminopropyl trimethoxysilane, the hydrolysis reaction will result in the evolution of methanol to create (3-aminopropyl)silanetriol:

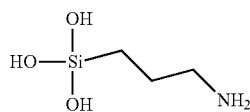

The aminosilane is then reacted with a carbonate and/or an epoxy alcohol in the aqueous media to yield a silylurethane and/or a silylamino polyol, respectively. It is contemplated in many embodiments that, when any of $A_1$, $A_2$, and $A_3$ in compound (1) comprise an alkyl group, the compound should be introduced to water and allowed to hydrate fully before reacting with the carbonate and/or the epoxy alcohol. Nonetheless, it is contemplated in some embodiments that this hydrolysis reaction will not proceed to completion before reaction with the carbonate and/or the epoxy alcohol Any suitable carbonate, if used, may be employed. In preferred aspects, the carbonate has a formula according to the following Formula. (2):

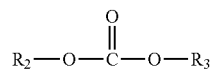

wherein $R_2$ and $R_3$ each independently are an alkyl group (with or without terminal hydroxyl groups), or $R_2$ and $R_3$ form a cyclic structure that may include any one or more of an alkyl group, a hydroxyalkyl group, and a hydroxyl group as substituents. In some embodiments, the cyclic carbonate may have an empirical formula of $C_{(3+y)}H_{(4+2y)}O_4$, where y is an integer of up to four. The carbonate may, for example, comprise a carbonate having the following formula:

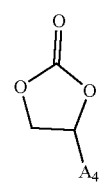

where $A_4$ is an alkyl group, a hydroxyalkyl group, or a hydroxyl group. One suitable carbonate is glycerol carbonate:

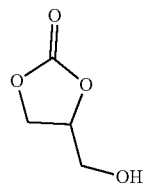

The resulting monomer will be represented by the following general Formula (6):

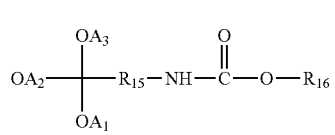

wherein $A_1$, $A_2$, and $A_3$ are the same or different and typically are hydrogen, but some or all may comprise a $C_1$ to $C_4$ alkyl group, $R_{15}$ is an alkylene group or an alkylene amine group, and $R_{16}$ includes an alkyl group including at least one hydroxyl group. For example, when (3-aminopropyl)silanetriol is reacted with glycerol carbonate, the reaction proceeds as follows:

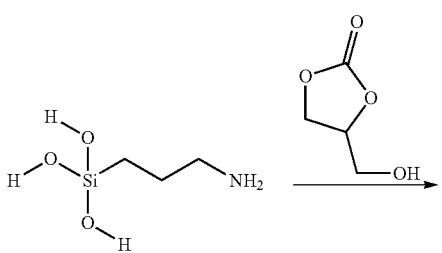

-continued

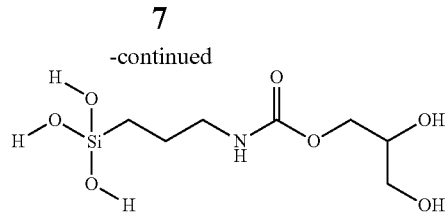

The ratio of aminosilane to cyclic carbonate is preferably between 0.5 to 5.0, but ratios above and below this range are possible. Generally, the reaction may occur at any suitable temperature and pressure, and in practice, it has desirably been found that satisfactory results can be obtained at room temperature (about 20 to about 25° C.) and at approximately 101 kPa, Desirably, the pH of the mixture is maintained between pH 6 and pH 11.

The resulting product is itself a 1K water based solution that has long term shelf stability and is stable in water, yet that is capable of forming siloxane bonds effectively upon water evaporation. Insofar as the present application discloses aspects other than the method for preparing the coating composition, it should be noted that the above reaction is not limiting, however, as there are other ways to create the crosslinker that constitutes the product of this reaction. Furthermore, it should be noted that the epoxysilane is not necessary to achieve adequate dry erase performance. The combination of aminosilane and carbonate alone provide excellent dry erase performance, but an epoxysilane, as discussed above, may be provided to add further durability.

It has also been observed that various epoxy alcohols can be used in place of (or in combination with) the carbonate to achieve excellent dry erase performance. In one approach, suitable epoxy alcohols are those of Formula 2a

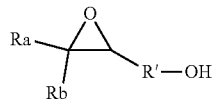

wherein R' is direct bond or a $C_1$ to $C_4$ alkylene linker and Ra and Rb are each independently a hydrogen or a $C_1$ to $C_4$ alkyl group. In some approaches, the epoxy alcohol is glycidol. If the epoxy alcohol is used, reaction of the aminosilane and epoxy alcohol may be the following (exemplified with glycidol):

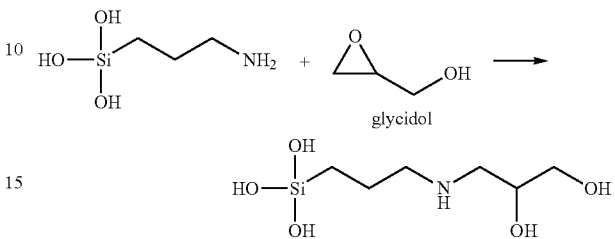

Other higher or lower epoxy alcohols may be used as needed for a particular application. An exemplary resulting monomer or crosslinker when using the epoxy alcohol may be of Formula (8) below:

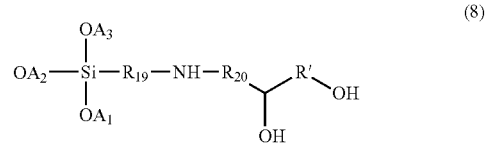

(8)

where $A_1$, $A_2$, and $A_3$ are the same or different and are hydrogen or a $C_1$ to $C_4$ alkyl group, $R_{19}$ is an alkylene group or an alkylene amino group, $R_{20}$ is an alkylene group, and R' is as defined above.

When the water in the solution evaporates, the silanol groups begin to crosslink with each other forming a highly crosslinked urethane/silane structure or aminopolyol/silane structure (example below is of the urethane structure, but a similar cross-linked structure will form with the amino polyol crosslinkers):

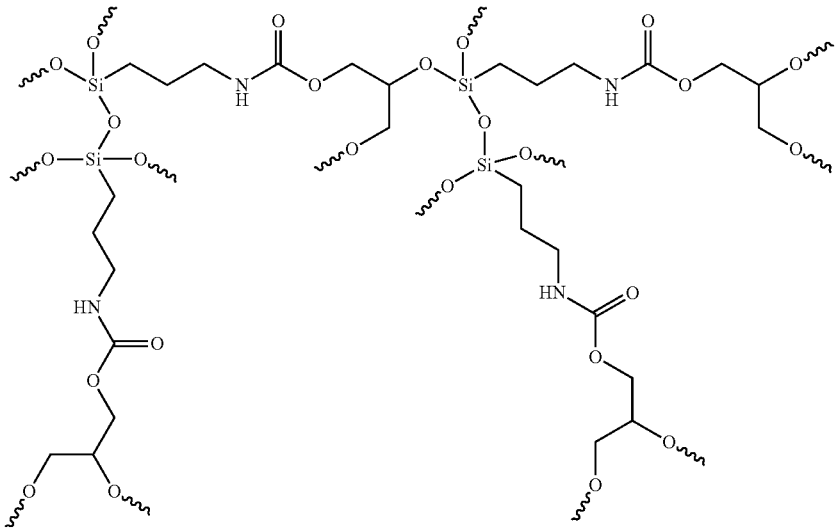

∿∿∿ = crosslink to neighboring dry erase molecule

In other aspects, a coating obtained from a coating composition prepared in accordance with the above process can exhibit good dry-erase properties. In practice, the water resistance of the above-exemplified polymer was found to be less than desired. Accordingly, it is additionally contemplated to employ excess aminosilane, and to additionally introduce an epoxysilane. The epoxysilane also reacts with the aminosilane to yield an aminodisilane crosslinker, thereby resulting in a coating composition that comprises the silylurethane monomer/crosslinker and/or the silylamino polyol monomer/crosslinker and the aminodisilane monomer/crosslinker. The introduction of the epoxysilane is intended to improve the hydrophobicity of the cured coating. Additionally, epoxies also readily react with amine groups at room temperature which is an added benefit for cycle time in manufacturing.

Any suitable epoxysilane may be employed. For example, the epoxysilane may have a structure according to the following formula (3):

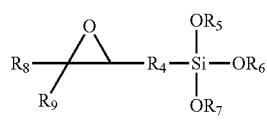

(3)

wherein $R_4$ is any one or more of an alkylene group, a branched alkylene group, an ester group, or an ether group, and may include a hydroxyl group, $R_5$ to $R_7$ may be the same or different and including alkyl groups, and $R_8$ and $R_9$ may be the same or different and include hydrogen or $C_1$ to $C_4$ alkyl groups. One such epoxysilane is glycidoxypropyltrimethoxysilane, which is sold as SILQUEST A-187 by Momentive Performance Materials Inc. In this embodiment, when (3-aminopropyl)silanetriol is reacted with glycidoxypropyltrimethoxysilane in the presence of water, the reaction proceeds as follows:

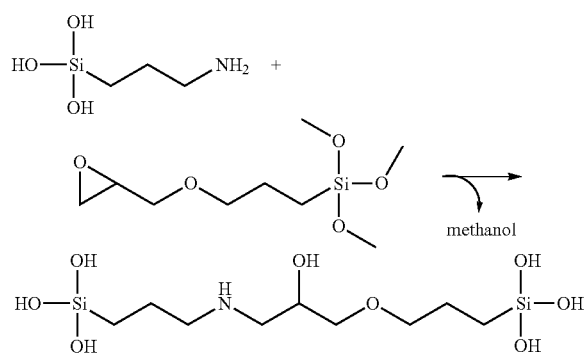

More generally, the product of the aminosilane and the epoxysilane will be an aminodisilane having the following formula (7):

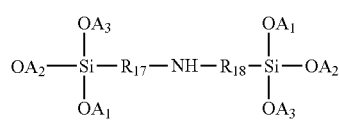

(7)

where $A_1$, $A_2$, and $A_3$ are the same or different and are hydrogen or a $C_1$ to $C_4$ alkyl group, $R_{17}$ is an alkylene group or an alkylene amine group, $R_{18}$ is an alkylene group optionally including at least one hydroxyl group.

Another suitable epoxysilane is sold as SILQUEST A-186, also by Momentive Performance Materials Inc. This epoxysilane has the following structure:

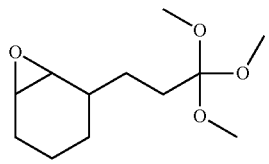 [SMILES: COC(CCC1CCCC2OC12)(OC)OC]

In another embodiment, the epoxysilane may have a structure according to the following Formula (4):

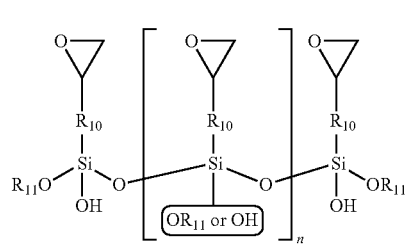

(4)

where $R_{10}$ may be one or more of an alkylene group, a branched alkylene group, an ester group, or an ether group, and $R_{11}$ may be an alkyl group. In such case, n may be an integer ranging from 1 to 100. One such material is sold as CoatOSil* MP 200 Silane by Momentive Performance Materials Inc.

In other embodiments, the epoxysilane may have a structure according to the following formula (5):

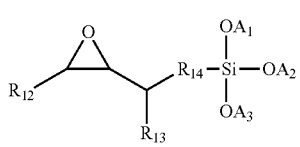

(5)

wherein $R_{12}$ and $R_{13}$ are a cyclic carbon structure, and $R_{14}$ is any one or more of an alkylene group, a branched alkylene group, an ester group, or an ether group, and optionally include a hydroxyl group.

The aminosilane should be in excess of the epoxysilane, for example at a ratio of 5 to 1, but this ratio is not critical and. a wide range of values for this ratio are operable. At higher amount of epoxysilane, the reaction mixture becomes unstable in water and starts to condense and crosslink in the liquid phase. It is desirable to add an acid, such as acetic acid, to the aminosilane prior to the addition of the carbonate. The final pH may be maintained below about pH 9 to prevent the silane groups from crosslinking in the liquid phase. The presence of an acid in excess can cause the film to dry much more slowly. A pH in the range of 7 to 8.5 is believed to best balance to maintain stability.

Generally, upon reaction of the aminosilane with the epoxysilane, a mixture of of silylurethane and/or silylamino polyol and aminodisilane crosslinkers will be formed. In some embodiments, a coating composition comprises water and a mixture of silylurethane monomers/crosslinkers and/or silylamino polyol monomers/crosslinkers and aminodisilane monomers/crosslinkers including monomers/crosslinkers according to the following formulas (6) and (7) and (8) respectively:

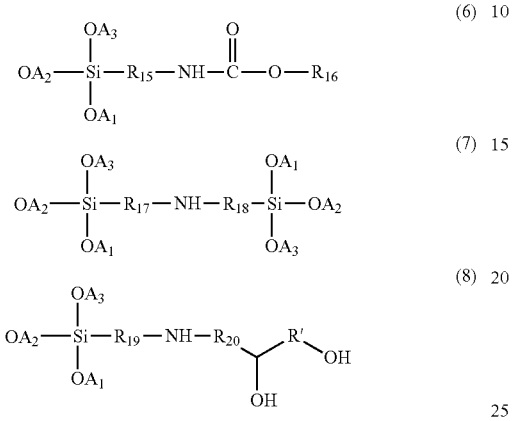

where $A_1$, $A_2$, and $A_3$ are the same or different and are hydrogen or a $C_1$ to $C_4$ alkyl group, $R_{15}$ is an alkylene group or an alkylene amine group, and $R_{16}$ is an alkyl group including at least one hydroxyl group, $R_{17}$ is an alkylene group or an alkylene amine group, and $R_{18}$ is an alkylene group including at least one hydroxyl group, $R_{19}$ is an alkylene group or an alkylene amino group, $R_{20}$ is an alkylene group, and R' is as defined above. The coating composition may have a solids content of the foregoing monomers of any suitable amount, such as about 30 to about 90%. The ratio of (6) to (8) to (7) may be any suitable ratio.

The coating composition may include other functional ingredients in amounts intended for their effective purposes. For example, the coating composition may contain a colorant or a pigment. Desirably, when the coating composition is intended for use as a whiteboard paint, the pigment may be titanium dioxide. The colorant may be present in any amount suitable to impart color and covering effect to the finished coating. Other suitable pigments include any suitable pigment particles, such as azo pigments, anazurite, aluminum silicate, aluminum potassium silicate, aluminum paste, anthraquinone pigments, antimony oxide, barium metaborate, barium sulfate, calcium carbonate, calcium metaborate, calcium metasilicate, carbon black, chromium oxides, clay, copper oxides, copper oxychloride, dioxazine pigments, feldspar, hansa yellows, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be employed. Colored pigments ordinarily would not be employed for whiteboard paint, but could be used in other applications. The pigment may be used in any amount suitable for imparting color to the composition.

The composition further may include a plasticizer to improve water sensitivity. It is believed that exposure of the cured coating to water may tend to increase crosslinking (post-cure drift), thus hardening the film and making the film susceptible to cracking. A flexible plasticizer or spacer may be added to at least partially alleviate embrittleness due to additional post-cure silanol crosslinking. One suitable spacer is polyethylene glycol (such as PEG8000) which can be added until the desired flexibility is achieved, however some dry erase performance may worsen at higher concentration.

Additional hydroxysilanes may be employed. For example, a compound, containing a siloxane group, and represented by the following general formula:

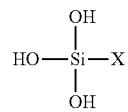

where X is one or more functional groups, may be used to provide a monomer with high performance dry-erase properties and the additional functionality of the functional groups represented by X.

The coating composition also may include any one or more of dispersants, surfactants, wetting agents, synergists, and rheology modifiers. These materials are preferably soluble in a range of solvents from non-polar solvents, such as odorless mineral spirits, to polar solvents, such as methyl ethyl ketone. Any suitable dispersant, such as any one or more of anionic dispersants, cationic dispersants, amphoteric dispersants, or nonionic dispersants may be used in conjunction with a pigment vehicle. Other known dispersants believed to be suitable include Nuosperse® 657 and Nuosperse® FA 196 available from Elementis Specialties, Disperbyk 108 available from Altana AG, and Solsperse™ M387 available from Lubrizol Corporation. Similarly, any suitable wetting agents such as any one or more of anionic wetting agents, cationic wetting agents, amphoteric wetting agents, or nonionic wetting agents may be used. An exemplary synergist is Solsperse™ 5000 available from Lubrizol Corporation. Exemplary rheology modifiers include Suspeno 201-MS available from Pol Resyn, Inc. and Aerosil® available from Evonik Industries.

Once formed, the coating composition may be applied immediately to a substrate, but the coating composition also may be dispensed into a suitable container, such as a paint can, and sealed. It is believed that the coating composition will have a shelf life of at least twelve months.

Once applied to the substrate, the coating composition will cure as water evaporates and as the composition crosslinks. The curing process does not require additional equipment (e.g., a UV source), but rather, curing occurs in the open air through the evaporation of the water from the water-based solution and as water is evolved in the crosslinking reaction.

The coating composition may be employed for any suitable purpose. In certain embodiments, the coating composition may be applied to a surface in order to impart dry-erase characteristics. For example, the surface may be a wall, which may have paint or a primer already applied to the surface of the wall, over which the coating can be applied. The coating composition may be applied with brush, roller, sponge, or spray gun, or other conventional painting tool. The cured coating may have any suitable thickness, such as a thickness ranging from about 0.05 mm to about 2 mm.

The high amount of crosslinking that occurs provides a coating that has a low porosity. The low porosity increases the durability of the coating, the resistance of the coating to water, and the resistance of the coating to marker ghosting.

When the coating composition is applied to a surface, and allowed to successfully cure, a dry-erase marker may be used to mark the surface of the coating. As the siloxane linkages (formed through self-crosslinking) have low surface energy and good barrier properties, the ink from the dry-erase marker does not penetrate into or chemically bond with the cured coating. Accordingly, the dry-erase marker ink can be successfully removed by wiping without a cleaning solution or using a commercially available dry-erase cleaner that includes chemicals (e.g., water, propylene glycol n-butyl ether, and/or isopropyl alcohol). In addition, the coating may be able to resist a ghosting effect when marker ink is left on the surface for up to >1 month, due to the low porosity.

EXAMPLES

The following examples are illustrative of exemplary embodiments of the disclosure. In these examples as well as elsewhere in this application, all ratios, parts, and percentages are by weight unless otherwise indicated. It is intended that these examples are being presented for the purpose of illustration only and are not intended to limit the scope of the invention disclosed herein.

Dry-erase properties of two coating composition samples were coated onto a LENETA® test chart, available from the Leneta Company, Inc. (Mahwah, N.J.). For comparison, similar charts were coated with two commercial 2K dry-erase coating compositions, Contractor Series 2K ISO Dry Erase and SKETCH PAD™ 2K NISO, both available from The Sherwin-Williams Company (Cleveland, Ohio). Common dry-erase marker types, including the EXPO® Low-Odor Dry Erase marker, available from Sanford L.P. (Oak Brook, Ill.) and the AVERY® MARKS-A-LOT® marker, available from the Avery Dennison Corporation (Glendale, Calif.) were tested. Both markers confirm to ASTM D4236 standards. Ink from each dry-erase marker was allowed to stand on the cured surface for a set period of time, and the surface was then wiped clean with a dry erase brush or a cloth. The cured coating compositions were rated for ink acceptance, i.e., the lifting or bleeding of the ink mark on the surface of the paint film, and ink removal, with the rating scale being 1 (worst) to 3 (best). As shown in Table 1 below, the exemplary coating compositions performed as well as the commercial 2K dry-erase coating products.

TABLE 1

| DRY-ERASE PERFORMANCE TEST | | | |
|---|---|---|---|
| CONTROL PRODUCT | | LAB SAMPLE OF DRY ERASE RESIN | |
| Contractor Series 2K ISO Dry Erase | SKETCH PAD™ 2K NISO | Lab Sample #1 | Lab Sample #2 |
| 1 Day Air Dry | 3 | 3 | 3 | 3 |
| 1 Week Air Dry | 3 | 3 | 3 | 3 |
| >1 Week Air Dry | 3 | 3 | 3 | 3 |
| 1 day air dry after liquid sample 4 weeks in oven at 120° F. | N.A. (2K) | N.A. (2K) | 3 | 3 |

Although the above description has focused on the disclosed coating compositions as dry-erase compositions, the compositions are contemplated to have many other uses. For example, the coating composition may be applied to a metal surface, in particular a ferrous surface, to form a rust-resistant or other protective coating layer on the metal surface. The composition may be applied to other surfaces such as concrete, painted or unpainted drywall, or plastics. It is also contemplated that the coating composition may be used as a coalescent aid in water-based paints.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

It is to be understood that each component, compound, substituent or parameter disclosed herein is to be interpreted as being disclosed for use alone or in combination with one or more of each and every other component, compound, substituent or parameter disclosed herein. It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of making a coating composition, the method comprising:
   reacting an excess amount of an aminosilane with an epoxy alcohol in aqueous media to yield a silylamino polyol crosslinker; and
   including an epoxysilane in the reaction and allowing the epoxysilane to react with the aminosilane to yield an aminodisilane crosslinker, wherein a coating composition is formed that includes the silylamino polyol crosslinker and the aminodisilane crosslinker.

2. The method according to claim 1, further including preparing said silylamino polyol crosslinker and said aminodisilane crosslinker in a single reaction vessel.

3. The method according to claim 1, wherein the aminosilane has a structure represented by the Formula (1):

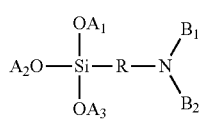

(1)

wherein $A_1$, $A_2$, and $A_3$ are the same or different and are hydrogen or a $C_1$ to $C_4$ alkyl group, $B_1$ and $B_2$ are the same or different and are hydrogen or a $C_1$ to $C_4$ alkyl group, with the proviso that at least one of $B_1$ and $B_2$ is hydrogen, and R is a $C_1$ to $C_4$ alkylene group.

4. The method according to claim 3, wherein each of $A_1$, $A_2$, and $A_3$ is hydrogen.

5. The method according to claim 4, wherein the aminosilane is aminopropyl trisilanol.

6. The method according to claim 3, wherein each of $A_1$, $A_2$, and $A_3$ is independently a $C_1$ to $C_4$ alkyl group.

7. The method according to claim 6, wherein the aminosilane is an aminopropyl trialkoxysilane.

8. The method according to claim 7, wherein the aminosilane is aminopropyl trimethoxysilane.

9. The method according to claim 1, the epoxy alcohol has a formula according to Formula (2a):

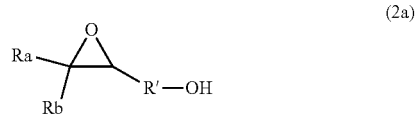

(2a)

wherein R' is direct bond or a $C_1$ to $C_4$ alkylene linker and Ra and Rb are each independently a hydrogen or a $C_1$ to $C_4$ alkyl group.

10. The method according to claim 9, wherein the epoxy alcohol is glycidol.

11. The method according to claim 1, wherein the epoxysilane has a structure according Formula (3):

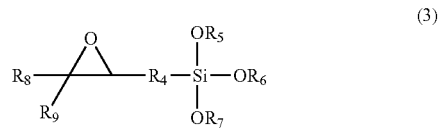

(3)

wherein $R_4$ is any one or more of an alkylene group, a branched alkylene group, an ester group, and an ether group, $R_5$ to $R_7$ are the same or different alkyl groups, and $R_8$ and $R_9$ are the same or different and are hydrogen or a $C_1$-$C_4$ alkyl group.

12. The method according to claim 11, wherein the epoxysilane is glycidoxypropyl trimethoxysilane.

13. The method according to claim 1, wherein the epoxysilane has a structure according to formula (4):

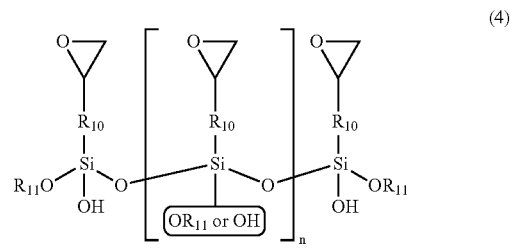

(4)

wherein $R_{10}$ is any one or more of an alkylene group, a branched alkylene group, an ester group, and an ether group, $R_{11}$ is an alkyl group, and n is an integer from 1 to 100.

14. The method according to claim 1, wherein the epoxysilane has a structure according to Formula (5):

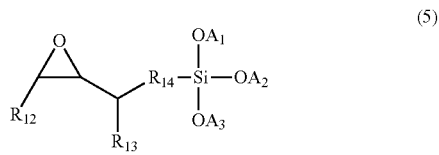

(5)

wherein $R_{12}$ and $R_{13}$ are a cyclic carbon structure, and $R_{14}$ is any one or more of an alkylene group, a branched alkylene group, an ester group, and an ether group, and $A_1$, $A_2$, and $A_3$ are the same or different and are hydrogen or a $C_1$ to $C_4$ alkyl group.

15. The method according to claim 1, including maintaining the reaction pH between 6 and 11.

16. The method according to claim 1, further including adding a plasticizer.

17. The method according to claim 16, wherein the plasticizer is polyethylene glycol.

18. The method according to claim 1, further including adding a pigment.

19. The method according to claim 18, wherein the pigment is titanium dioxide.

20. The method according to claim 1, further including a carbonate, wherein the aminosilane reacts with the carbonate to form a silylurethane.

* * * * *